United States Patent
Balaraja Shetty et al.

(10) Patent No.: US 12,432,417 B2
(45) Date of Patent: Sep. 30, 2025

(54) REMINDER TO TAKE ITEMS WHEN LEAVING

(71) Applicant: DISH NETWORK TECHNOLOGIES INDIA PRIVATE LIMITED, Karnataka (IN)

(72) Inventors: Vikram Balaraja Shetty, Bengaluru (IN); Dileep Puramana, Wandoor (IN); Visali Manoharan, Chennai (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 38 days.

(21) Appl. No.: 18/541,914

(22) Filed: Dec. 15, 2023

(65) Prior Publication Data

US 2025/0203158 A1 Jun. 19, 2025

(51) Int. Cl.
*H04N 21/442* (2011.01)
*G06F 3/16* (2006.01)
*H04N 21/4223* (2011.01)
*H04N 21/488* (2011.01)

(52) U.S. Cl.
CPC ......... *H04N 21/44218* (2013.01); *G06F 3/16* (2013.01); *H04N 21/4223* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 8,866,607 | B2 * | 10/2014 | Velusamy | G08B 21/0269 340/568.1 |
| 9,489,821 | B2 * | 11/2016 | King | G08B 21/24 |
| 10,264,547 | B1 * | 4/2019 | Zhong | H04W 4/02 |
| 2004/0213557 | A1 * | 10/2004 | Krakirian | H04N 21/4334 348/E5.002 |
| 2007/0262862 | A1 * | 11/2007 | Barrett | G08B 21/0202 340/539.15 |
| 2016/0044451 | A1 * | 2/2016 | Marth | H04W 4/029 340/8.1 |
| 2016/0373570 | A1 * | 12/2016 | Scavezze | H04W 4/025 |
| 2017/0353833 | A1 * | 12/2017 | de Barros Chapiewski | H04L 67/52 |
| 2018/0190103 | A1 * | 7/2018 | Daoura | G08B 25/10 |
| 2021/0314735 | A1 * | 10/2021 | Klinkner | H04W 4/38 |
| 2023/0306837 | A1 * | 9/2023 | Patel | G06N 20/00 |

* cited by examiner

Primary Examiner — Alexander Q Huerta
(74) Attorney, Agent, or Firm — Seed Intellectual Property Law Group LLP

(57) ABSTRACT

A system and method for providing a notification regarding a tracked physical item to a user, and a set-top box. The system includes a central unit and an item notification module. The system includes a display and/or speaker. The system includes an event input device configured to provide event data and a tracking data device configured to provide tracking data to the central unit to track the physical item and/or the user upon the user being determined to be leaving a location to attend the event. The system further can receive the event data, establish criteria for providing the notification, receive the tracking data provided by the tracking data device, determine whether the tracking data meets the criteria, and, if so, cause the display and/or speaker to display and/or announce the notification.

20 Claims, 7 Drawing Sheets

REMINDER TO TAKE ITEMS WHEN LEAVING

BACKGROUND

In our busy lives, it is with occasion that people will inevitably leave a place (e.g., home, work or the like) without remembering items that are necessary or important. For example, a person may leave their home forgetting his/her keys to the house or office, or may leave for an important work event without remembering to bring a briefcase or important papers.

Technological advances have allowed for location of certain items that have been lost or forgotten, e.g., by using transponders to identify a location of a lost item. Further, users may set reminders on a phone, or the like, to remember to take an item, but current systems do not provide a smart ability to remind a user to take an item that may otherwise be left.

SUMMARY

In some embodiments, a system is provided that can allow for a notification to a user at a predetermined time, the notification being one to remind a user to take an item. For example, the system may include a central unit with programming to receive information about one or more of an item, a location, or a user, and can, upon predetermined criteria being achieved, provide a notification to a user to take the item.

According to some embodiments, a system for providing a notification regarding a tracked physical item to a user is provided. The system includes a central unit comprising or otherwise connected to a local or remote processor and an item notification module stored on a local or remote memory. The system also includes a display and/or speaker connected to the central unit, the display and/or speaker configured to display and/or announce the notification regarding the tracked physical item to the user, an event input device configured to provide event data for an event having a relationship to the tracked physical item, and a tracking data device that is configured to provide tracking data to the central unit to track the physical item and/or the user upon the user being determined to be leaving a location to attend the event. The item notification module includes instructions that, when executed, cause the processor to receive the event data provided by the event input device, establish criteria for providing the notification regarding the tracked physical item to the user, receive the tracking data provided by the tracking data device, determine whether the tracking data meets the criteria, and cause the display and/or speaker to display and/or announce the notification regarding the tracked physical item to the user in response to the tracking data being determined to meet the criteria for providing the notification regarding the tracked physical item to the user.

According to some embodiments, a method of providing a notification, to a user, to take a tracked physical item includes receiving event data provided by an event input device at a central unit comprising or otherwise connected to a local or remote processor and an item notification module stored on a local or remote memory wherein the event data is for an event to which the tracked physical item is to be taken. The method further includes establishing criteria for providing the notification to take the tracked physical item to the user, receiving tracking data provided by a tracking data device at the central unit, wherein the tracking data is generated by tracking the physical item and/or the user upon the user being determined to be leaving a location to attend the event, determining whether the tracking data meets the criteria for providing the notification to take the tracked physical item to the user, and causing a display and/or speaker to display and/or announce the notification to take the tracked physical item to the user in response to the tracking data being determined to meet the criteria for providing the notification to take the tracked physical item to the user.

According to some embodiments, a set-top box is provided. The set-top box includes a power source, an electronic component configured to receive at least one of a plurality of signals from a media content provider, a central unit comprising or otherwise connected to a local or remote processor and an item notification module stored on a local or remote memory. The item notification module includes instructions that, when executed, cause the processor to receive event data for an event having a relationship to the tracked physical item, establish criteria for providing the notification regarding the tracked physical item to the user, receive tracking data to track the physical item and/or the user upon the user being determined to be leaving a location to attend the event, determine whether the tracking data meets the criteria for providing the notification to take the tracked physical item to the user, and cause a display and/or speaker to display and/or announce the notification regarding the tracked physical item to the user in response to the tracking data being determined to meet the criteria for providing the notification regarding the tracked physical item to the user.

DETAILED DESCRIPTION OF EMBODIMENTS

The various embodiments described herein generally provide systems, apparatuses and methods that may aid in allowing a user to retrieve an item at a predetermined time.

As an example, a user may have certain scheduled events to attend. Some events may require use of a vehicle, which may be operated by a key or a key fob or the like. Some events may require the user to bring certain documents, such as a lunch box, an ID card, a test report, a plane ticket, and so on.

Conceived herein are systems, apparatuses and methods that may use pre-programmed information, real-time assessments, and/or artificial intelligence. These may include determining what items may be necessary at a particular time for a particular event, and/or determining whether a user has such items, and/or notifying (e.g., reminding) the user to retrieve certain items, for example in a case that the system has determined that the user does not have such items at a predetermined time, or otherwise when the system determines that it is an appropriate time to remind the user to take such an item.

Figure 1:
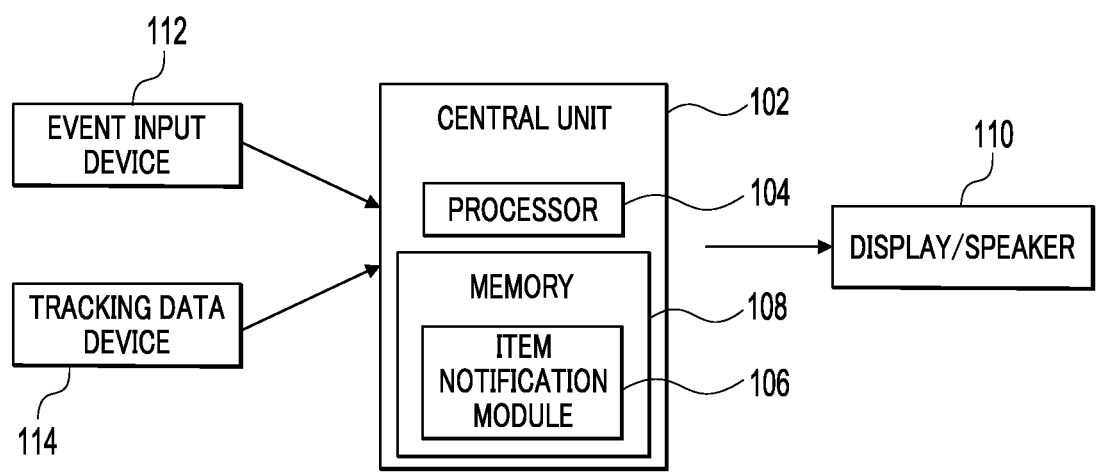
FIG. 1 shows a system according to one or more embodiments.

FIG. 1 shows an example system of some embodiments. In the embodiment of FIG. 1, a central unit 102 is utilized as a unit that can carry out certain of the features of the instant application. As discussed in FIGS. 2A and 2B, the central unit 102 may be a part of or at least connected to a set-top box 200.

The set-top box 200 may be an apparatus through which a user views content stored on or transmitted through. Such content will originate from a content provider, travel through a network to the central unit 102 communicatively connected to the set-top box 200, and ultimately reach a display and/or speaker of the user, which may be a display/speaker 110, such display being any one or more of, for example, a television set, computer, tablet, or cellular phone, or any other viable display mechanism.

The set-top box 200 may also include digital video recording (DVR) technology and may be communicatively coupled to the display device through any type of wired or wireless connection. Exemplary wired connections include coax, fiber, composite video and high-definition multimedia interface (HDMI). Exemplary wireless connections include WiFi and Bluetooth. In at least one embodiment, the set-top box 200 may be embodied in a television converter device (e.g., a satellite television receiver). The set-top box 200 may also be incorporated into the display device. The set-top box 200 should not be limited and can be any device which is capable of receiving data streams and processing and managing presentation of such data streams on the presentation device, including a computer, server, streaming players (Apple TV, Roku, etc.), or other similar device.

The set-top box 200 may include or otherwise be communicatively connected to a processor 104. The processor 104 may be hardware processor and may include a central processing unit and/or a microprocessor and associated circuitry. Further, the set-top box 200 may include or be communicatively connected to a memory 108, the memory 108 storing data including, for example, information regarding an item.

As discussed in more detail later, the central unit is communicatively connected to event input device 112, tracking data device 114 and display/speaker 110. The event input device 112 may be any device that allows for data regarding an input to be entered, such as a remote control, a cellular phone, a tablet, a microphone (as part of the display/speaker 110 or otherwise), a shared calendar, and so on. The tracking data device 114 may be any device that includes technology or another component that allows for tracking, such as a sensor (e.g., a proximity sensor), a camera, a phone, a tablet, and so on.

As discussed in more detail later, the display/speaker is a device that may provide a notification to a user. The display/speaker 110 may be a television set that is connected to the central unit 102, the screen also serving as a mechanism to display media content transmitted through the central unit 102, may be an audio speaker connected directly to the central unit 102, or may be communicatively or otherwise operatively connected to the central unit 102 in a manner that the display/speaker 110 can receive information (e.g., via the internet, a local connection, a wired or wireless connection, or so on). In such a case, the display/speaker 110 may be a cellular phone, a dashboard or other screen on an automobile, a standalone display screen, and so on.

While specific iterations are discussed in more detail later, in some embodiments, a system may be included for providing a notification regarding a tracked physical item to a user. The system includes the central unit 102, which includes or is otherwise connected to a local or remote hardware processor, as well as an item notification module 106. The item notification module may be stored on a local or remote memory 108, the local memory being within the central unit 102 or otherwise within the set-top box 200. In embodiments where the memory 108 is remote, it may be provided on a cloud storage system that is communicatively connected to the set-top box 200.

In some embodiments, the display/speaker 110 is connected to the central unit 102. The display/speaker 110 is configured to display and/or announce the notification regarding the tracked physical item to the user under certain circumstances. The system further includes an event input device 112 configured to provide event data for an event having a relationship to the tracked physical item. The relationship may be, for example, an event where the user should or must take the tracked physical item, such as keys to start a vehicle or to enter an office or to return to a house, or medical records for a doctor's appointment.

The system may further include a tracking data device 114 that is configured to provide tracking data to the central unit 102 to track the physical item and/or the user upon the user being determined to be leaving a location to attend the event.

The item notification module 106 includes instructions that, when executed, cause the processor 104 to receive the event data provided by the event input device 112, establish criteria for providing the notification regarding the tracked physical item to the user, receive the tracking data provided by the tracking data device 114, determine whether the tracking data meets the criteria, and cause the display/speaker 110 to display and/or announce the notification regarding the tracked physical item to the user in response to the tracking data being determined to meet the criteria for providing the notification regarding the tracked physical item to the user.

The criteria may include, for example, whether a user has already taken the tracked physical item, whether the user may need the tracked physical item for the event, whether the user has previously indicated a need or lack of need for such item with reference to such an event, or some other criteria relating to a user's relationship to the tracked physical item and/or the event.

Figure 2A:
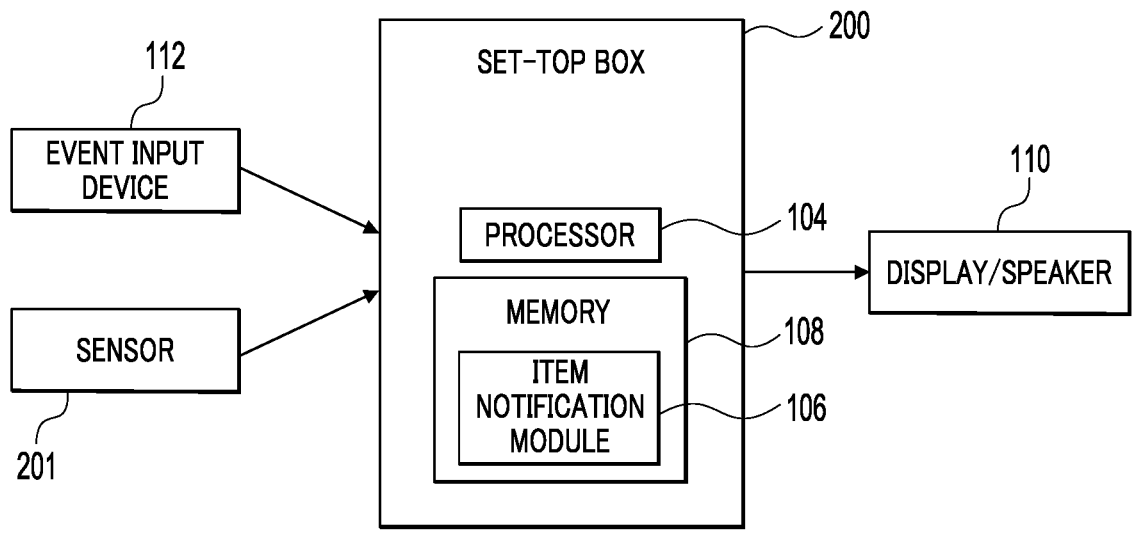
FIG. 2A shows a system including a sensor communicating with a receiver according to one or more embodiments.

FIG. 2A shows an embodiment where data is acquired from a sensor 201, as an example of tracking data device 114. The sensor 201 may be, for example, a hardware proximity sensor having circuitry that is placed near an entrance/exit door. The sensor 201 may determine whether a user is leaving a location such as a house, and/or whether the user is leaving with certain items. The sensor 201 will communicate with the system of FIG. 1, for example by transmitting information regarding its sensing to the central unit 102. Such information can then be utilized by the processor 104 as criteria in order to determine whether a notification should be made to a user, and/or stored in the memory 108 for later action.

Figure 2B:
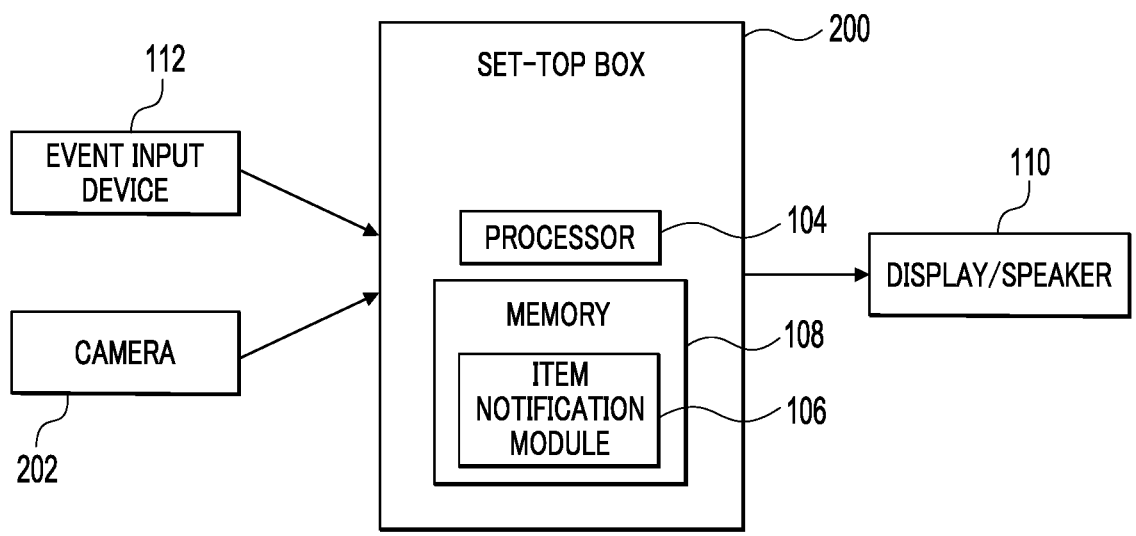
FIG. 2B shows a system including a camera communicating with a receiver according to one or more embodiments.

FIG. 2B shows an embodiment where data is acquired from a camera 202, as an example of tracking data device 114. A camera 202 may be, for example, a camera having circuitry that is placed near an entrance/exit door. The camera 202 may determine whether a user is leaving the house, and/or whether the user is leaving with certain items, for example by capturing an image identifying either situation, and assessing, either alone or in conjunction with the processor 104, the image. The camera 202 may also be placed at a different location where a visual of the particular item can be acquired. The camera 202 will communicate with the system of FIG. 1, for example by transmitting information regarding its sensing to the central unit 102. As an example, whether an item, for example, keys to an office or a house, have been taken at a predetermined time can be determined by the camera 202. Such information can then be utilized by the processor 104 as criteria in order to determine whether a notification should be made to a user, and/or stored in the memory 108 for later action.

In some embodiments, both a sensor 201 and camera 202 can be utilized as tracking data device 114. That is, the embodiments of FIGS. 2A and 2B can be combined. In other embodiments, another data acquisition device may be utilized in addition to or instead of the sensor 201 and camera 202. In still other embodiments, as described in more detail later, determinations as to whether a notification should be made and ultimately is made to the user can occur without the use of a sensor 201 or a camera 202, for example by consulting a stored schedule of a user, which is another example of a tracking data device 114. For example, the processor 104 may acquire schedule information regarding the stored schedule of the user either via the memory 108, via user input using a phone or other input, or via machine learning taking into consideration a past history of a user, and can determine whether or not to notify a user to take an item based solely upon such schedule information or some characteristic within the schedule information, such as an internal reminder, flagged by the user or otherwise, that an item should be taken to a particular place.

While the embodiment of FIGS. 2A and 2B utilize a hardware set-top box 200 comprising a central unit 102, either in place of or in addition to the set-top box 200, a central unit hosted in a cloud may be utilized to carry out one or more of the processing and/or storing of information in some embodiments. That is, the processor 104 and/or memory 108 of FIG. 1 may be hosted in a cloud and not explicitly within a hardware set-top box. In such a case, the cloud-hosted central unit will be networked to the user's display, either directly or using the set-top box 200 as an intermediate receiver and/or transmitter.

Figure 3:
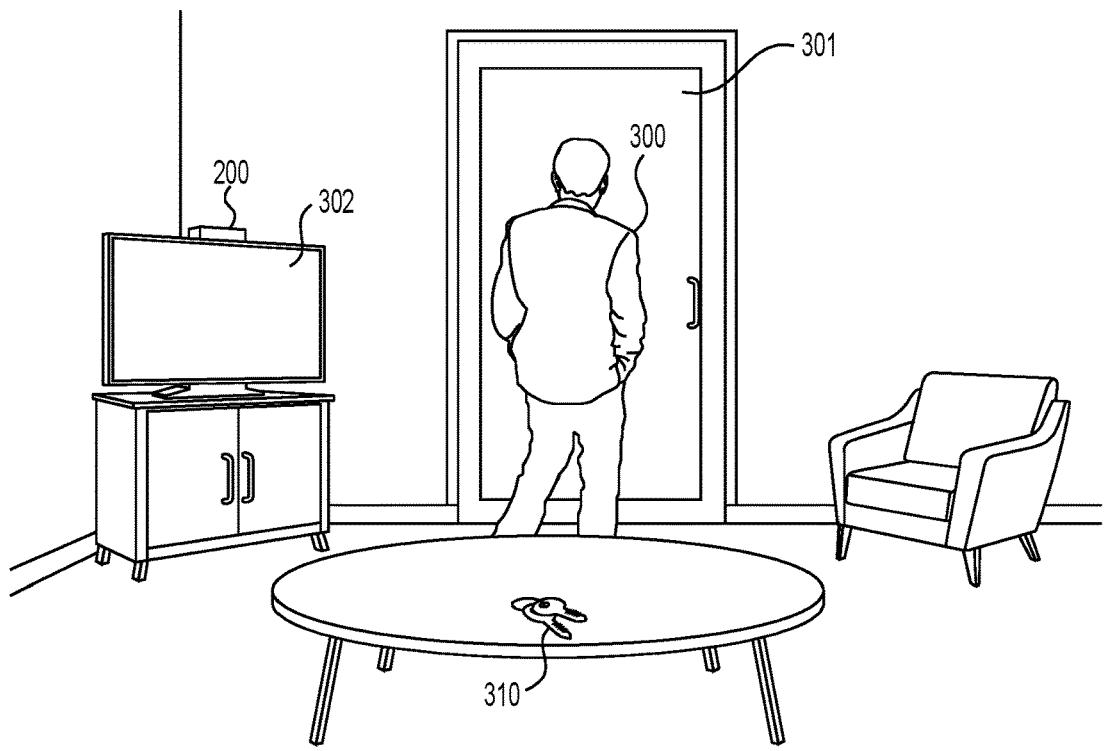
FIG. 3 is a pictorial diagram of an environment according to one or more embodiments.

FIG. 3 is a representation of an environment conceived by the instant application. As shown in FIG. 3, a user 300 is at a location, for example the user's home. The user may be deciding to leave the home to attend an event, and may require a physical item 310 for such an event. The user 300 may be deciding to leave the home by entering/exiting through door 301.

While not limited, the physical item 310 is shown as a user's keys, which may be keys to operate a vehicle, enter an office, a house, or the like. Other physical items 310 may include a key fob, certain documents, such as a lunch box, an ID card, a test report, a plane ticket, and so on.

Also shown in FIG. 3 is the set-top box 200 of FIGS. 2A and 2B, which is communicatively connected to a television set 302. The television set 302 is an example of a display/speaker 110 of FIG. 1.

Figure 4:
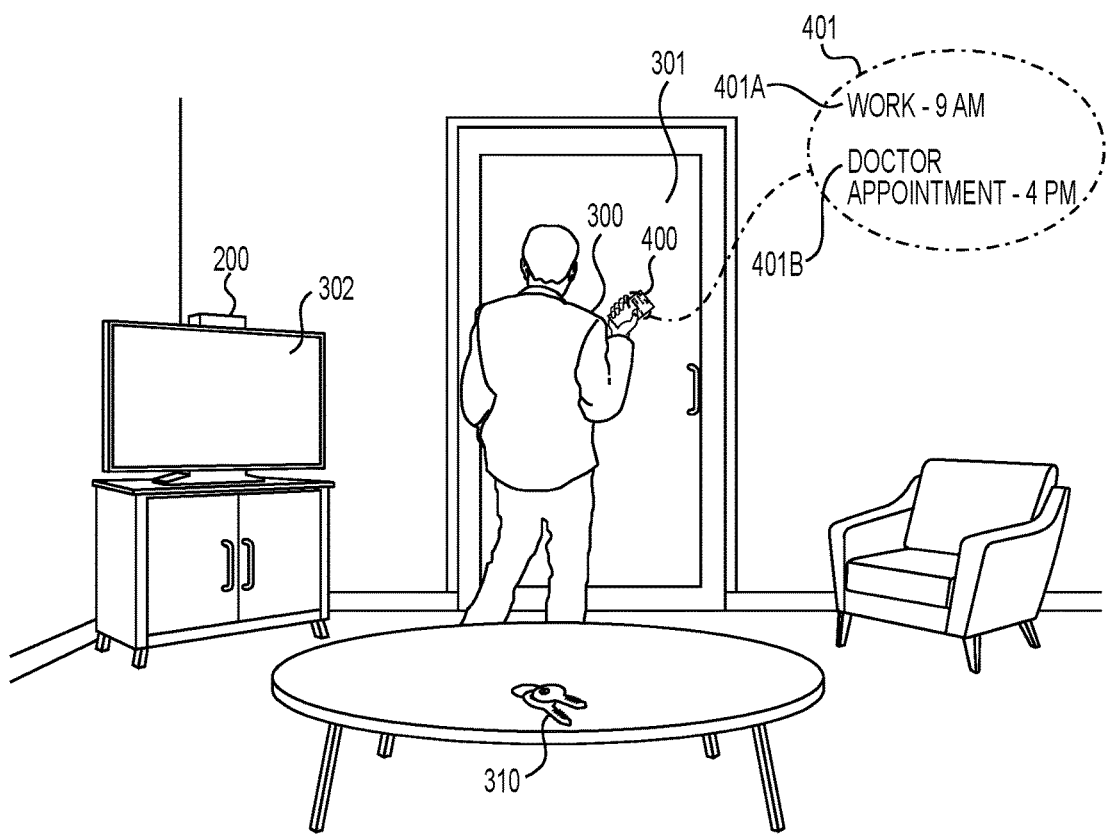
FIG. 4 is a pictorial diagram of an environment according to one or more embodiments.

FIG. 4 shows an embodiment of the instant application utilizing the environment and situation described in FIG. 3. Here, the user 300 carries a portable device 400 such as a cellular telephone, a personal data assistant, a tablet or the like. The portable device 400 is an example of the event input device 112 of FIG. 1 and includes certain events 401 regarding the user 300's schedule. These may include a "work at 9 AM" event 401A, and a "doctor appointment at 4 PM" event 401B. These events may be entered by the user 300 into the portable device 400 (e.g., via an input such as a touch screen, keyboard, or speaker), or otherwise iteratively acquired by the portable device 400 based upon previous events.

The portable device 400 may also include certain other information, such as information about a physical item 310. For example, the portable device may also include information nested within an event, such as "doctor appointment at 4 PM" 401B, to bring an item therewith. This may be entered by the user 300 into the portable device 400, or otherwise iteratively acquired by the portable device 400 based upon previous events/occurrences and/or items taken to previous events.

In some embodiments, the events 401 in the portable device 400 of the user 300 may be transmitted to the processor 104 of the central unit 102 connected to the television set 302, or hosted in a cloud and communicatively connected to the television set 302. In some embodiments, instead of a portable device 400, the event input device may include a remote control, a microphone, a shared calendar, or some other device that can receive an input about the event.

Figure 5:
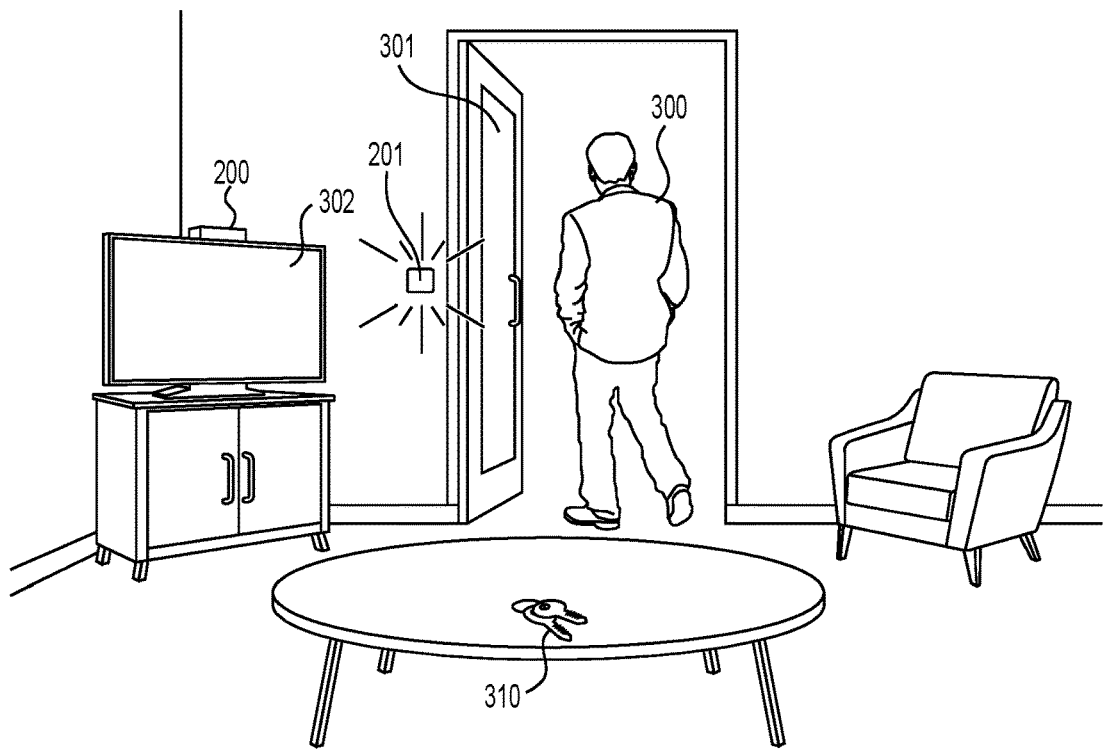
FIG. 5 is a pictorial diagram of an environment including a sensor according to one or more embodiments.

FIG. 5 shows an embodiment of the instant application utilizing the environment and situation described in FIG. 3. Here, the user 300 passes by the proximity sensor 201 when he is exiting the door 301. In such a case, the sensor 201 may alert the processor 104 that the user is leaving. The processor 104 may then carry out certain determinations, described later, to determine whether or not the user 300 should be notified and/or reminded to take an item 310.

In some embodiments, the sensor 201 may include some magnetic or electric components that may be able to determine whether the user is carrying a particular item 310, particularly one having metal. This information may also be transmitted to the processor 104 for its use in determining whether or not the user 300 should be notified and/or reminded to take an item 310.

The embodiment of FIG. 5 may occur in addition to or instead of the embodiment of FIG. 4. That is, some embodiments may include both a sensor 201 or other tracking data device 114, and a portable device 400 or some other event input device 112 that includes information about events, an item to be taken, or both.

Further, in some embodiments, the events 401 may be entered subsequent to a speaker (one exemplary input device) prompting a user where the user is going. The audio from the user may be utilized by the processor 104, in conjunction with other stored information about events and/or items utilized for such events, to aid in the determination as to whether or not to notify a user to take an item.

Figure 6:
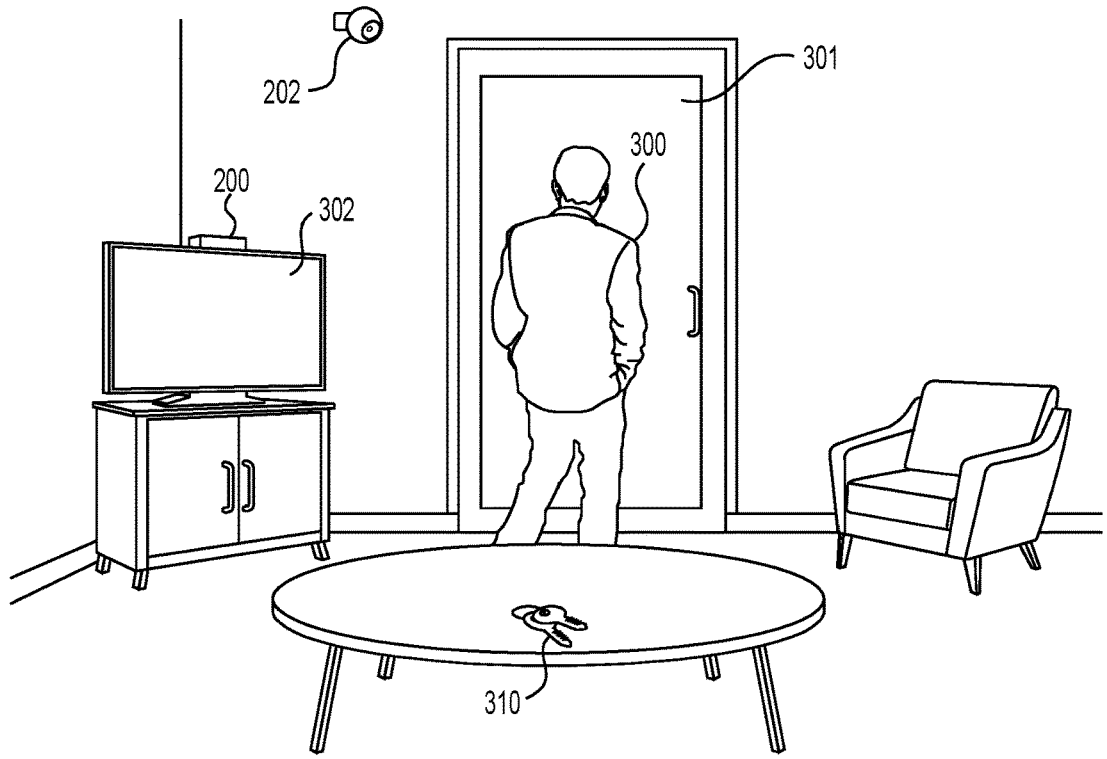
FIG. 6 is a pictorial diagram of an environment including a camera according to one or more embodiments.

FIG. 6 shows an embodiment of the instant application utilizing the environment and situation described in FIG. 3. Here, the user 300 passes by the camera 202 when he is exiting the door 301. In such a case, the camera 202 may perform image capture and alert the processor 104 that the user is leaving. The processor 104 may then carry out certain determinations, described later, to determine whether or not the user 300 should be notified and/or reminded to take an item 310.

In some embodiments, the camera 202 may be a movable camera and/or a series of cameras and/or may be positioned in another location in order to view, for example, where the physical item 310 is. The camera 202 may thus acquire data as to whether the item 310 has been retrieved at a particular time, either in addition to or instead of determining when the user is exiting the door 301, and may send such information to the processor 104 which can then utilize such information to determine whether or not the user 300 should be notified and/or reminded to take an item 310.

Further in some embodiments, the items 310 may have tags (e.g., geotags) that identify their location, and these tags may be further shared to the processor 104 in order to aid in the determination as to whether or not to provide the notification.

The embodiment of FIG. 6 may occur in addition to or instead of the embodiments of both FIG. 4 and FIG. 5. That is, some embodiments may include two or more of the sensor 201, the camera 202 and the portable device 400 that includes information about events, an item to be taken.

Figure 7A:
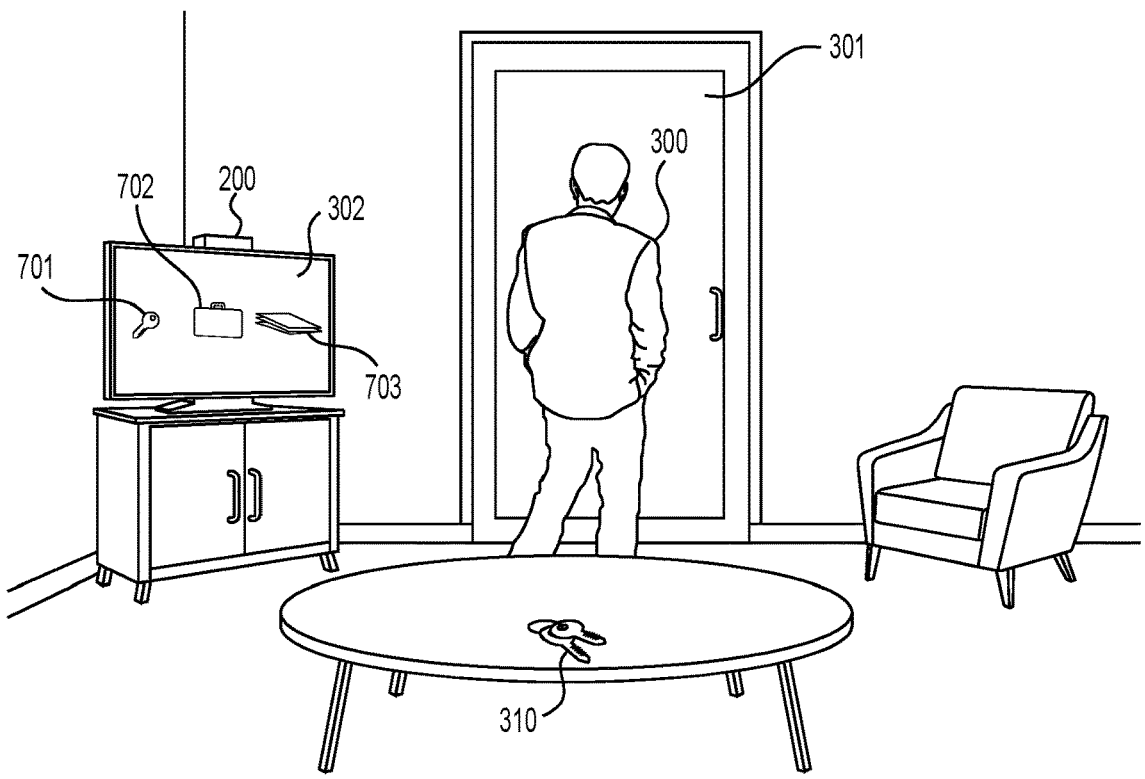
FIG. 7A is a pictorial diagram of an environment including a television providing a notification according to one or more embodiments.

FIG. 7A shows an embodiment consequent to the environment described by any one of FIGS. 3-6 where a notification relating to items is provided on the television set 302 (e.g., on a display screen).

To determine whether or not a notification should be made to the user, the processor 104 will make one or more of a series of determinations. As a first example, the processor 104 will consider stored information from the memory 108 and assess whether a predetermined criterion is satisfied. In the embodiment of FIG. 4, the stored information may include information about a user's schedule, which are either directly sent from the portable device 400 to the processor 104, or to the memory 108, or otherwise entered into the memory 108 at some time point either by the user (e.g., via an input device such as a keyboard, touch screen or speaker), by a result of machine learning due to past events being entered and processed, or by some other action. The processor 104 may then consult the memory 108 for this stored information, and assess when the user 300 may be leaving to attend an event listed in the user's schedule. This may be supplemented by one or both of sensor data acquired from sensor 201 in FIG. 5, or camera data acquired by camera 202 in FIG. 6.

While the processor 104 may acquire data regarding events directly from the portable device 400, the sensor 201 or the camera 202, it may also be programmed to make assumptions about likely events even when they are not explicitly shown as events in the portable device 400, or triggered by activation of the sensor 201 or camera 202. For example, the processor 104 may iteratively learn tendencies of the user and may understand, for example, the differences between weekdays and weekends, or certain days of the week, and may thus determine that an event may or may not be forthcoming based upon its own machine learning independent of any learning or data from the portable device 400, the sensor 201 or the camera 202. In this case, the event input device 112 and/or tracking data device 114 are established as a subcomponent of the processor 104.

While the processor 104 is programmed to acquire and/or determine information about the presence of the event itself, it is further programmed to determine whether a particular item, such as physical item 310, may be necessary for such an event. For example, the processor 104 may make an assessment that the user is leaving for work at 9 AM and requires keys as the item 310 in order to attend work. The processor 104 may further make an assessment that the user has a doctor's appointment at 4 PM and may have learned, either by user input, machine learning or other iterative knowledge, that the user may not be returning home before the doctor's appointment. In such a case, the processor 104 may determine that an item necessary for the doctor's appointment should also be taken when the user leaves for work at a predetermined time or at a time as understood by the activation of the sensor 201 and/or camera 202.

Whether an item is necessary for a particular event may be inputted directly by the user, for example into the portable device 400 or other event input device 112, which then communicates with processor 104, or directly into the set-top box 200 and/or the processor 104. It may also be learned by the processor 104 based upon stored information relating to other events and/or similar events, e.g., information stored in the memory 108 or otherwise.

The processor 104 will ultimately make a concrete determination, based upon one or more of the information relating to the event, the information relating to the item, a predetermined time, and a user's action to exit, whether to notify the user regarding the item, for example, to take the item.

As one example, the processor 104 may determine that item 310 (e.g., keys) is necessary for work, which occurs at 9 AM. The processor 104 may determine that, at a predetermined time, e.g., some time before 9 AM to allow the user sufficient time to get to work, a reminder to take the item 310 should occur. The predetermined time may be some preset time or may be learned, for example, after repeated instances of the user leaving at 8:30 AM, the predetermined time may become 8:30 AM. This determination may be further affected if a sensor 201 and/or camera 202 is present, and the sensor 201 and/or camera 202 will then trigger the reminder to occur instead of at the predetermined time.

The determination may be further affected if, for example, the sensor 201 and/or camera 202 determines that the user has taken the necessary item 310. In such a case, the processor 104 may determine not to notify the user 300 to take the item 310.

Figure 8:
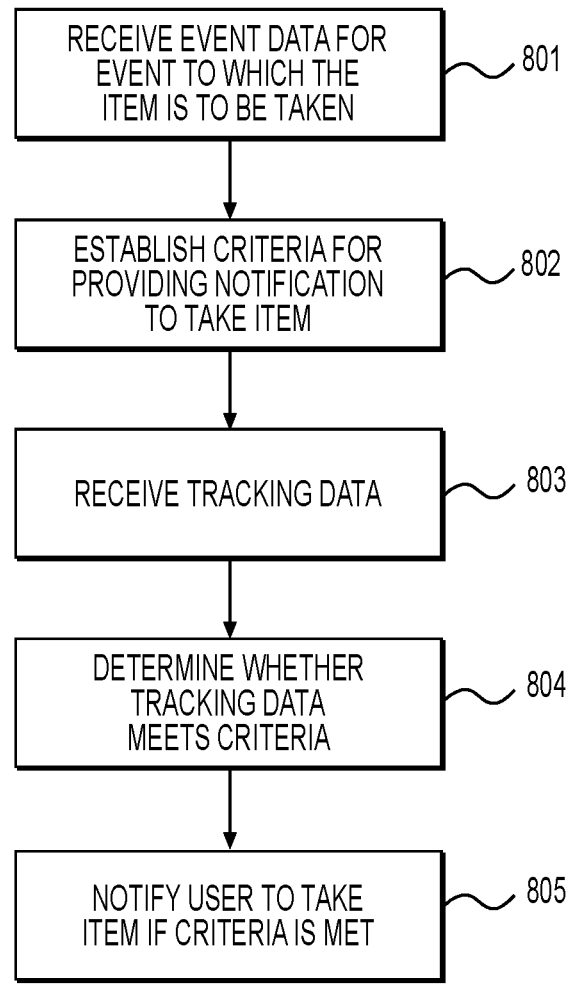
FIG. 8 is a flow diagram illustrating an exemplary method according to one or more embodiments.

More generally, and as shown in FIG. 8, in step 801, the method includes receiving event data provided by an event input device at a central unit comprising or otherwise connected to a local or remote processor and an item notification module stored on a local or remote memory wherein the event data is for an event to which the tracked physical item is to be taken.

In step 802, criteria for providing the notification to take the tracked physical item to the user are established. In step 803, tracking data provided by a tracking data device is received, for example at the central unit. The tracking data may be generated by tracking the physical item and/or the user upon the user being determined to be leaving a location to attend the event.

In step 804, the method further determines whether the tracking data meets the criteria for providing the notification to take the tracked physical item to the user and in step 805, the method causes a display and/or speaker to display and/or announce the notification to take the tracked physical item. This is in response to the tracking data being determined to meet the criteria for providing the notification to take the tracked physical item to the user.

Figure 7B:
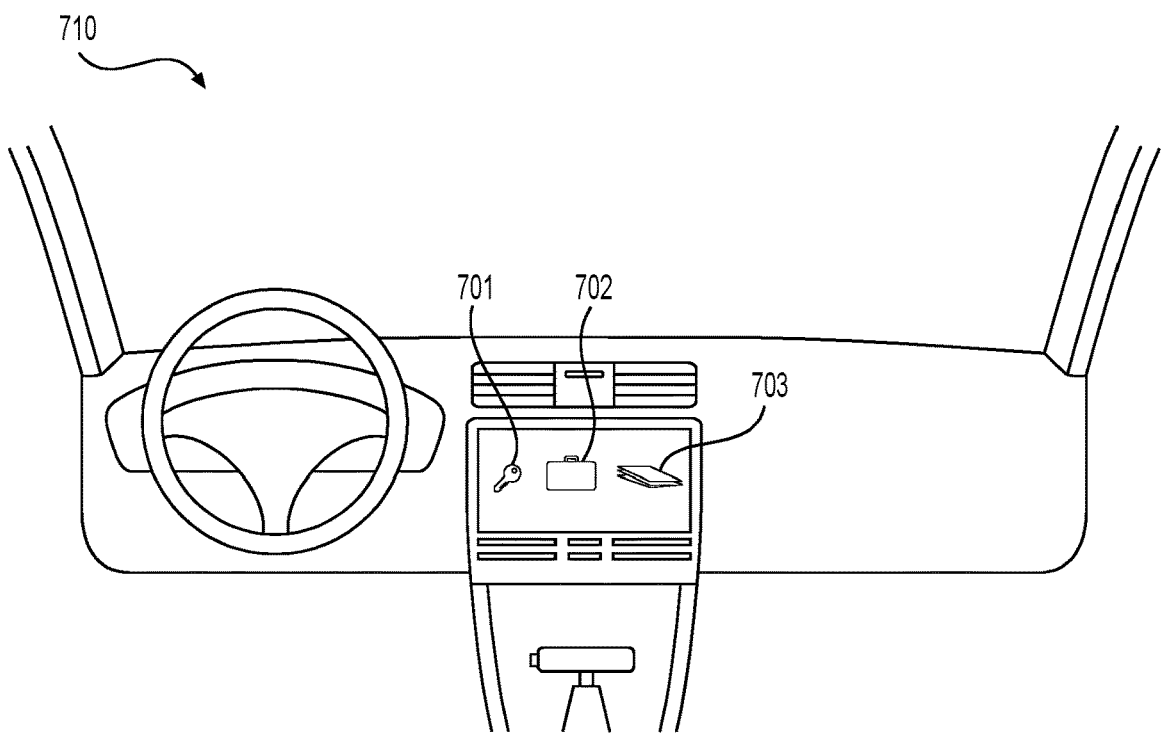
FIG. 7B is a pictorial diagram of an environment including a vehicle display providing a notification according to one or more embodiments.

In step 805, if a predetermined criterion is reached, the user is notified to take the item, e.g., via a graphical or textual representation of items 701, 702, 703 on television set 302 (e.g., a display screen) in FIG. 7A or via a graphical or textual representation of the items 701, 702, 703 on a display screen of a vehicle 710 as in FIG. 7B. In other embodiments, the notification may be provided on a mobile device such as the portable device 400, or on some screen near door 301, or on any display that has some communicative connection to the processor 104. The connections from the processor 104 to any display device, and from the processor 104 to any other device within the system, may be occur via radiofrequency (RF), infrared (IR) transmission, by internet (wired or wireless) or local network transmission, optionally including Bluetooth or other near field transmission.

Figure 9:
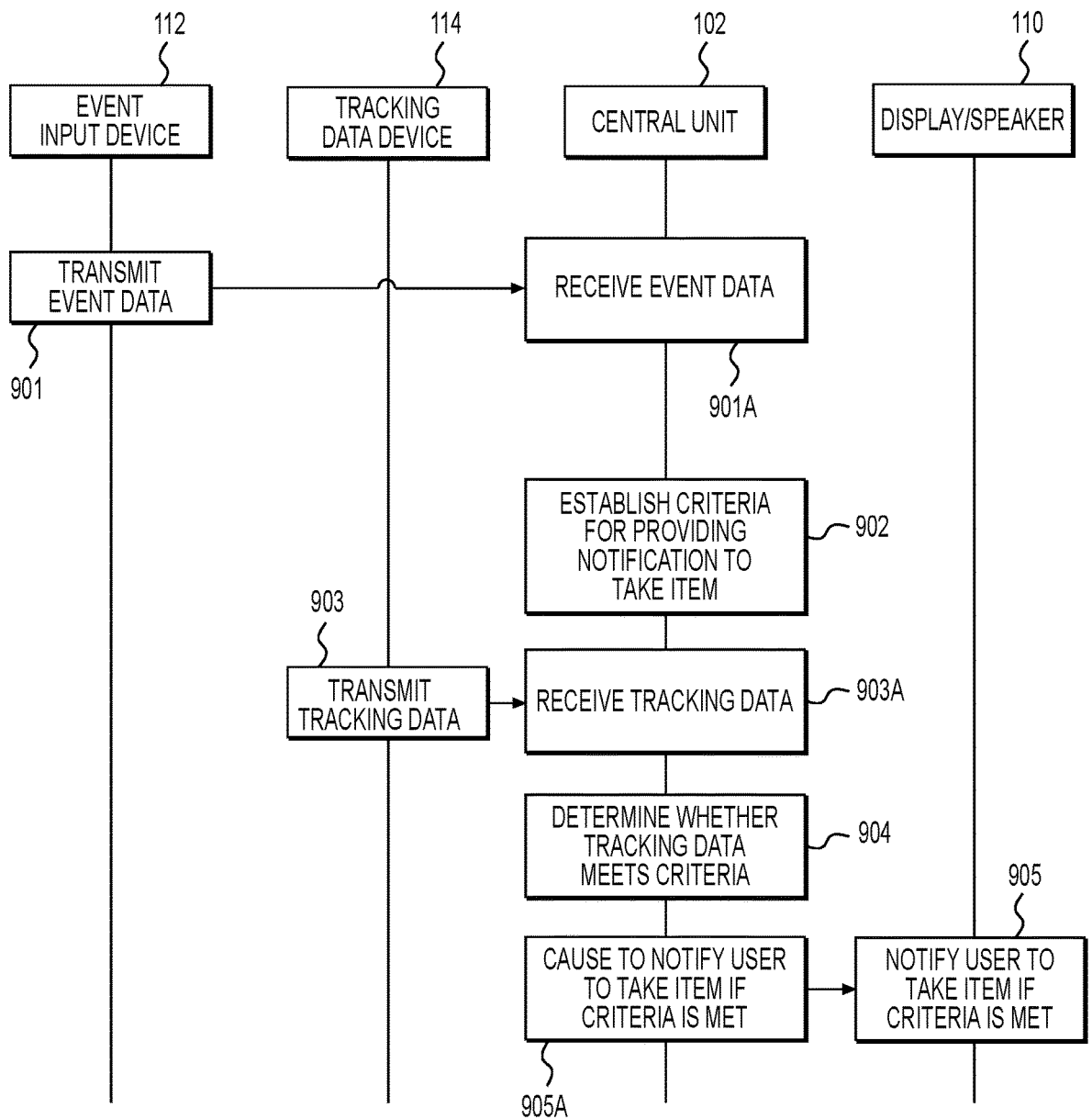
FIG. 9 is a flow diagram illustrating an exemplary method utilizing various hardware according to one or more embodiments.

FIG. 9 is another representation of the method of FIG. 8, where, in step 901, the event input device 112 transmits the event data. The central unit 102 receives this event data at step 901A. In step 902, as in step 802 of FIG. 8, criteria for providing the notification to take the tracked physical item to the user are established.

In step 903, the tracking data device 114 transmits the tracking data. This is received by the central unit in step 903A. In step 904, as in step 804 in FIG. 8, the method further determines whether the tracking data meets the criteria for providing the notification to take the tracked physical item to the user and in step 905A, the central unit causes a display and/or speaker (display/speaker 110) to display and/or announce the notification to take the tracked physical item.

Then, in step 905, the display/speaker 110 displays and/or announces the notification.

Of course, in some embodiments, consequent to the determination that an item has been taken, only the missed items may be shown on the display. That is, the processor 104 may determine, based upon any of the assessment described herein, that keys have been taken, but that the report for the doctor's appointment has not been taken, in which case only the report for the doctor's appointment is shown as the notification on the display.

The predetermined criterion may be that the item is necessary for the event, that the item necessary for the event has not been taken (based upon information acquired by the sensor 201 or camera 202), that a predetermined notification time has been reached, that the user 300 is exiting a door 301, or some combination of these.

Owing to the features described above, an improved system for selectively identifying items that may be necessary for an event, and informing a user that is likely to have forgotten such items, can be achieved.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A system for providing a notification regarding a tracked physical item to a user, comprising:
   a central unit comprising or otherwise connected to a local or remote processor and an item notification module stored on a local or remote memory;
   a display and/or speaker connected to the central unit, the display and/or speaker configured to display and/or announce the notification regarding the tracked physical item to the user;

an event input device configured to provide event data for an event having a relationship to the tracked physical item; and a tracking data device that is configured to provide tracking data to the central unit to track the physical item and/or the user upon the user being determined to be leaving a location to attend the event;

wherein the item notification module includes instructions that, when executed, cause the processor to:

receive the event data provided by the event input device;

establish criteria for providing the notification regarding the tracked physical item to the user;

receive the tracking data provided by the tracking data device;

determine whether the tracking data meets the criteria, including:

determine that the user is not returning to a current location of the tracked physical item after another event and prior to the event; and in response to determining that the user is not returning to the current location of the tracked physical item after the other event and prior to the event, determine that the tracking data meets the criteria; and cause the display and/or speaker to display and/or announce the notification regarding the tracked physical item to the user in response to the tracking data being determined to meet the criteria for providing the notification regarding the tracked physical item to the user.

2. The system according to claim 1, wherein the central unit is a set-top box that receives a signal from a media content provider.

3. The system according to claim 1, wherein the event input device further includes a schedule of the user, the schedule of the user including the event.

4. The system according to claim 1, wherein the tracking data device is configured to track the physical item via tagging or image capture.

5. The system according to claim 1, wherein the tracking data device includes a sensor.

6. The system according to claim 5, wherein the sensor is configured to receive information of one or more of the user's exit and a location of the item, and to transmit the received information as the tracking data.

7. The system according to claim 1, wherein the tracking data device includes a camera configured to receive information of one or more of the user's exit and a location of the item, and to transmit the received information as the tracking data.

8. The system according to claim 1, wherein the processor is programmed to learn information relating to one or more of the tracked physical item, the user, a location of the item and the event based upon previous occurrences, and to update the item notification module in the memory based upon the learned information.

9. The system according to claim 1, wherein the item notification module is further configured to transmit the determination whether the tracking data meets the criteria to the memory.

10. The system according to claim 1, wherein the notification includes a graphical or textual depiction of the tracked physical item.

11. The system according to claim 1, comprising the speaker with a microphone, wherein the speaker is configured to prompt the user for information regarding the event at a predetermined time, and is further configured to transmit the information received from the user via the microphone to the processor.

12. The system according to claim 1, comprising the speaker, wherein the speaker is configured to provide the notification.

13. The system according to claim 1, further comprising at least one tag, the at least one tag provided on the tracked physical item, the at least one tag storing information regarding a location of the item and transmitting the location to the central unit.

14. The system according to claim 1, wherein the tracked physical item is a key.

15. The system according to claim 1, wherein the tracked physical item is a report necessary for an event.

16. A method of providing a notification, to a user, to take a tracked physical item, the method comprising:

receiving event data provided by an event input device at a central unit comprising or otherwise connected to a local or remote processor and an item notification module stored on a local or remote memory wherein the event data is for an event to which the tracked physical item is to be taken;

establishing criteria for providing the notification to take the tracked physical item to the user;

receiving tracking data provided by a tracking data device at the central unit, wherein the tracking data is generated by tracking the physical item and/or the user upon the user being determined to be leaving a location to attend the event;

determining whether the tracking data meets the criteria for providing the notification to take the tracked physical item to the user, including:

determining a current time of the tracking data;

determining that the event is to occur after a next event that is after the current time;

identifying the tracked physical item as being associated with the event from the event data;

determining that the user is not returning to the location of the tracked physical item after the next event and prior to the event; and in response to determining that the user is not returning to the location of the tracked physical item, determining that the tracking data meets the criteria; and causing a display and/or speaker to display and/or announce the notification to take the tracked physical item to the user in response to the tracking data being determined to meet the criteria for providing the notification to take the tracked physical item to the user.

17. The method according to claim 16, wherein the causing the display and/or speaker to display and/or announce the notification comprises displaying the notification on a screen, the notification including a representation of the item.

18. A set-top box configured to provide a notification regarding a tracked physical item, the set-top box comprising:

a power source;

an electronic component configured to receive at least one of a plurality of signals from a media content provider; and a local or remote processor and an item notification module stored on a local or remote memory, wherein the item notification module includes instructions that, when executed, cause the processor to:

receive event data for an event having a relationship to the tracked physical item;

establish criteria for providing the notification regarding the tracked physical item to a user;
receive tracking data to track the physical item and/or the user upon the user being determined to be leaving a location to attend the event;
determine a preliminary event that is to occur after the user leaves the location;
determine that the user is not returning to the location after the preliminary event and prior to the event; and
in response to determining that the user is not returning to the location, determine that the tracking data meets the criteria for providing the notification to take the tracked physical item to the user; and
cause a display and/or speaker to display and/or announce the notification regarding the tracked physical item to the user in response to the tracking data being determined to meet the criteria for providing the notification regarding the tracked physical item to the user.

19. The set-top box according to claim 18, wherein the memory is configured to store the determination whether the tracking data meets the criteria for providing the notification to take the tracked physical item to the user.

20. The set-top box according to claim 19, wherein the memory further includes the event data.

* * * * *